(12) United States Patent
Wu et al.

(10) Patent No.: US 10,588,108 B2
(45) Date of Patent: Mar. 10, 2020

(54) LOCATING METHOD AND A LOCATING DEVICE

(71) Applicant: EMC IP Holding Company LLC, Hopkinton, MA (US)

(72) Inventors: Chao Wu, Shanghai (CN); Li Zhai, Shanghai (CN); Robert Guowu Xia, Shanghai (CN); Krein Zuiliang Peng, Shanghai (CN); Andrew Anzhou Hou, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/269,262

(22) Filed: Sep. 19, 2016

(65) Prior Publication Data

US 2017/0086161 A1    Mar. 23, 2017

(30) Foreign Application Priority Data

Sep. 23, 2015  (CN) .......................... 2015 1 0612283

(51) Int. Cl.
*H04W 64/00* (2009.01)
*H04W 4/029* (2018.01)
(Continued)

(52) U.S. Cl.
CPC .............. *H04W 64/00* (2013.01); *G01S 1/00* (2013.01); *G01S 1/08* (2013.01); *G01S 5/02* (2013.01);
(Continued)

(58) Field of Classification Search
CPC ....... H04W 4/22; H04W 64/00; G01C 21/206
See application file for complete search history.

(56) References Cited

U.S. PATENT DOCUMENTS

| 5,502,613 | A | * | 3/1996 | Saitoh | ..................... B60L 13/04 |
| | | | | | 104/284 |
| 2008/0147461 | A1 | * | 6/2008 | Lee | ...................... G01C 21/206 |
| | | | | | 705/7.34 |

(Continued)

FOREIGN PATENT DOCUMENTS

| CN | 100339835 C | 9/2007 |
| CN | 103096443 | 5/2013 |

(Continued)

OTHER PUBLICATIONS

First Office Action (both Chinese & English versions) dated Jun. 3, 2019 by The State Intellectual Property Office of People's Republic of China, Chinese Application No. 201510612283.X, 16 pages.

*Primary Examiner* — Myron Wyche
(74) *Attorney, Agent, or Firm* — BainwoodHuang (57) ABSTRACT

Embodiments of the present disclosure relate to a method and apparatus for determining a location of device. The method comprises obtaining locations of at least three reference points associated with the device and determining the location of the device based on the locations of the at least three reference points. The embodiments of the present disclosure have advantages such as cheapness, easy implementation and easy installation, may provide an administrator with various management interfaces and monitoring interfaces, and expand the scope of applicability.

14 Claims, 7 Drawing Sheets

(51) Int. Cl.
*G01S 1/08* (2006.01)
*G01S 1/00* (2006.01)
*G01S 5/02* (2010.01)
*G01S 1/04* (2006.01)

(52) U.S. Cl.
CPC .......... *G01S 5/0221* (2013.01); *G01S 5/0268* (2013.01); *H04W 4/029* (2018.02); *G01S 1/042* (2013.01); *H04W 64/006* (2013.01)

(56) References Cited

U.S. PATENT DOCUMENTS

| | | | |
|---|---|---|---|
| 2013/0260781 A1 | 10/2013 | Un et al. | |
| 2014/0206307 A1* | 7/2014 | Maurer | H04W 4/90 |
| | | | 455/404.2 |
| 2015/0237834 A1* | 8/2015 | Schab | A01K 29/005 |
| 2015/0369900 A1* | 12/2015 | Pan | G01S 5/0252 |
| | | | 455/456.6 |

FOREIGN PATENT DOCUMENTS

| | | |
|---|---|---|
| CN | 103269517 | 8/2013 |
| CN | 104111884 A | 10/2014 |
| CN | 104602337 | 5/2015 |

* cited by examiner

| HEADER | PACKET TYPE | REFERENCE POINT IDENTIFIER | STATE | RESERVE | END |

FIG. 4A

| HEADER | PACKET TYPE | REFERENCE POINT IDENTIFIER | CONTROL | RESERVE | END |

FIG. 4B

| HEADER | PACKET TYPE | CLIENT IDENTIFIER | STATE | RESERVE | END |

FIG. 4C

| HEADER | PACKET TYPE | END |

FIG. 4D

| HEADER | PACKET TYPE | REFERENCE POINT/CLIENT IDENTIFIER | RESERVE | END |

LOCATING METHOD AND A LOCATING DEVICE

RELATED APPLICATION

This application claim priority from Chinese Patent Application Number CN201510612283.X, filed on Sep. 23, 2015 at the State Intellectual Property Office, China, titled "A LOCATING METHOD AND A LOCATING DEVICE," the contents of which is herein incorporated by reference in its entirety.

TECHNICAL FIELD

Embodiments of the present disclosure relate to positioning, and more specifically to an indoor positioning method and positioning apparatus.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

Embodiments of the present disclosure are intended to provide a method and apparatus for determining a location of a device, to solve the above problem.

In a first aspect, there is provided a method of determining a location of a device. The method comprises: obtaining locations of at least three reference points associated with the device; and determining the location of the device based on the locations of the at least three reference points.

BRIEF DESCRIPTION OF DRAWINGS

The figures described here are used to provide further understanding of the present disclosure and constitute a portion of the present application. Exemplary embodiments of the present disclosure and depictions thereof are used to illustrate the present disclosure, and not construed as improper limitation of the present disclosure, wherein.

DETAILED DESCRIPTION

Principles and spirit of the present disclosure are described with reference to several exemplary embodiments shown in the figures. It should be appreciated that these embodiments are described only to enable those skilled in the art to better understand and implement the present disclosure, and not intended to limit the scope of the present disclosure in any manner.

Typically, in data center management, how to locate a device (e.g., a server, a switch, or a storage box) is still a problem when there is something wrong with the device. Generally, as each vendor have various different devices that may have different designs, it is hard to persuade the venders to modify their product codes to give a data center management the location information, and it is still a challenging job for the operator of lab management. Generally, developing a positioning system that is cheap, feasible and easy to install can give a lot of help to a lab manager and can build an advantage over other vendors.

In a first aspect, there is provided a method of determining a location of a device. The method comprises: obtaining locations of at least three reference points associated with the device; and determining the location of the device based on the locations of the at least three reference points.

In some embodiments, the method further comprises: pre-establishing associations between the device and the at least three reference points.

In some embodiments, the pre-establishing associations between the device and the at least three reference points comprises: storing into a client at least three reference points received by the client with strongest signals, the client being arranged at the location of the device.

In some embodiments, the obtaining locations of at least three reference points associated with the device comprises: sending, via the client, a message to at least three associated reference points to trigger indicators at the locations of the at least three reference points.

In some embodiments, the method further comprises: instructing, via a reader, the client at the location of the device to send a message to the at least three associated reference points.

In some embodiments, the method further comprises: obtaining state information of the device from the client via the reader.

In a second aspect, there is provided an apparatus of determining a location of a device. The apparatus comprises: a reference location obtaining unit configured to obtain locations of at least three reference points associated with the device; and a device location determining unit configured to determine the location of the device based on the locations of the at least three reference points.

In some embodiments, the method further comprises an association establishing unit configured to pre-establish associations between the device and the at least three reference points.

In some embodiments, the association establishing unit is configured to store into a client at least three reference points received by the client and having the strongest signals, the client being arranged at the location of the device.

In some embodiments, the apparatus further comprises: a message sending unit configured to send, via the client, a message to at least three associated reference points to trigger indicators at the locations of the at least three reference points.

In some embodiments, the apparatus further comprises a reader communication unit configured to instruct, via a reader, the client at the location of the device to send a message to the at least three associated reference points.

In some embodiments, the reader communication unit is further configured to obtain state information of the device from the client via the reader.

In a third aspect, there is provided a computer program product for determining a location of a device, the computer program product being tangibly stored on a non-transitory computer-readable medium and including computer-executable instructions, the computer-executable instructions, when executed, enabling the computer to perform a step of the method of the first aspect.

The embodiments of the present disclosure have advantages such as cheapness, easy implementation and easy installation, may provide the administrator with various management interfaces and monitoring interfaces, and expand the scope of applicability.

Figure 1:
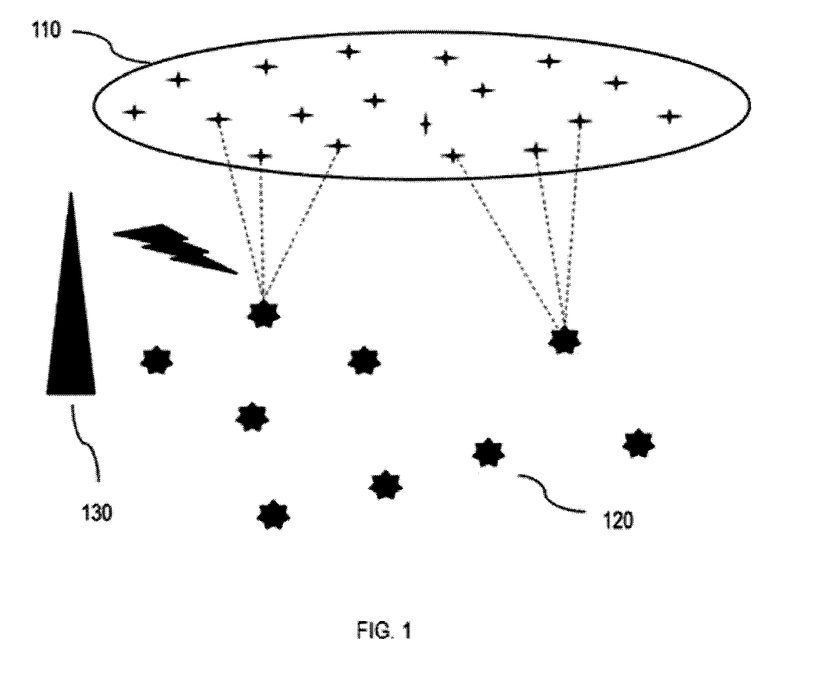
FIG. 1 is a view illustrating an architecture of a positioning system according to an embodiment of the present disclosure.

FIG. 1 is a view illustrating an architecture of a positioning system according to an embodiment of the present disclosure. As shown in FIG. 1, the positioning system comprises a plurality of reference points 110 and clients 120. For example, in a data center, the plurality of reference points 110 may be placed on a ceiling, and the reference points 110 may broadcast relevant information thereof, including a reference point identifier (e.g., a reference point number) and the like. "Reference point" herein may refer to a reference point device at the location of the reference point. Generally, a reference point is usually connected to mains supply, so power supply problem does not exist and thereby signals may be received and transmitted all the time. In addition, the client 120 is placed at each device, and these devices include server, switch, storage box and the like. After the client 120 is activated, the client 120 receives information from the reference points to determine at least three reference points with strongest signals, and the information of these reference points is stored in the client 120. When the client 120 detects something wrong with the device, it may send information to its associated reference points to trigger indicators at the location of the reference points. These indicators may be light-emitting diode (LED) indicators, or may include other indication devices such as sound alarm. The user may determine at least three reference points associated with the device, and determine a location of the client according to the at least three reference points, namely, the location of the device. A method of determining the location of the client via the reference points may employ any known positioning method, or in the case that the location of the client cannot be determined accurately, it may be positioned comprehensively in combination with abnormal state of an indicator (e.g., a lamp indicating a state of a server) of the device at the location of the client. In other words, a rough location of the malfunctioning device is determined via the reference point and client, and then at the rough location, the malfunctioning device is determined via the indicator of the malfunctioning device.

In addition, the positioning system may further comprise a reader 130. The reader 130 may send a command to the client so that the client reports status information of the device thereto, or the client triggers the indicator of the associated reference points to determine the position of the device.

Figure 2:
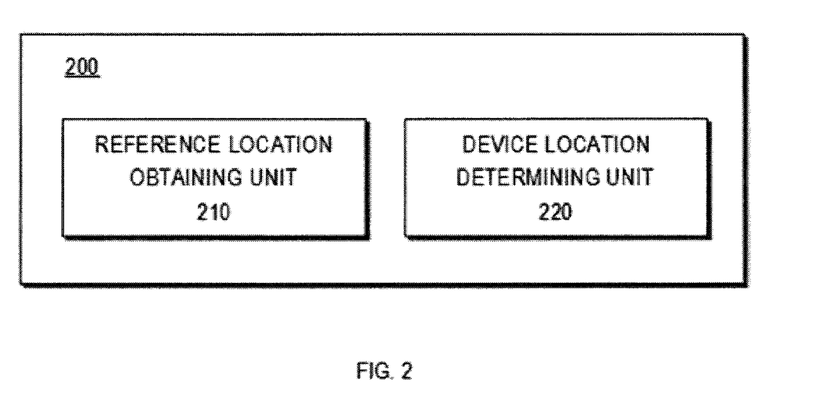
FIG. 2 is a block diagram illustrating a positioning apparatus according to an embodiment of the present disclosure.

FIG. 2 is a block diagram illustrating a positioning device according to an embodiment of the present disclosure. The device 200 comprises a reference location obtaining unit 210 and a device location determining unit 220. The reference location obtaining unit 210 is configured to obtain locations of at least three reference points associated with the device. The device location determining unit 220 is configured to determine a location of the device based on the locations of the at least three reference points. The device 200 may further comprise an association establishing unit configured to pre-establish associations between the device and the at least three reference points.

Figure 3A:
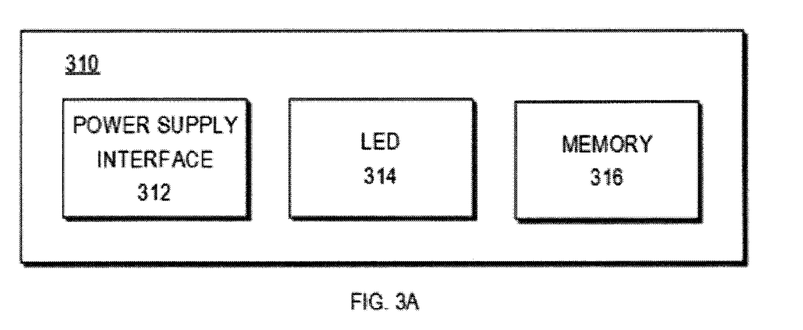
FIG. 3A is a block diagram illustrating a reference point device according to an embodiment of the present disclosure.

FIG. 3A-FIG. 3D respectively show block diagrams of a reference point device, a client and a reader. As shown in FIG. 3A, the reference point device 310 comprises a power supply interface 312, an LED 314 and a memory 316. The power supply interface 312 is usually connected to mains supply and used to power the reference point device 310. The LED 314 is an example of an indicator. The reference point device has a limited communication distance, and has a unique identifier such as a serial number. The memory 316 may be configured to store the unique identifier of the device 310, information of the associated clients and so on. The memory 316 is preferably an Electrically Erasable Programmable Read-Only Memory (EEPROM).

Figure 3B:
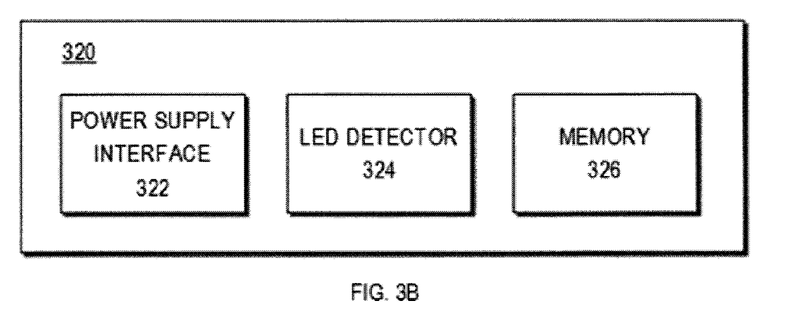
FIGS. 3B-3C are block diagrams illustrating client devices according to different embodiments of the present disclosure.

As shown in FIG. 3B, the client 320 is externally powered and comprises a power supply interface 332, an LED detector 324 and a memory 326. The power supply interface 322 may be connected to mains supply, or may be connected to a device such as a server via a Universal Serial Bus (USB) interface. The LED detector 324 is used to detect a state of the LED indicator on the device and thereby determine whether an operation state of the device is normal. When the operation state of the device is abnormal, a message may be sent to an associated reference point device to trigger the indicator at the location of the reference point and thereby determine the location of the device. The memory 26 may be used to store identifiers of associated reference points, as well as other information such as device state information obtained from the device via the USB interface, or device state information obtained by the LED detector 324.

Figure 3C:
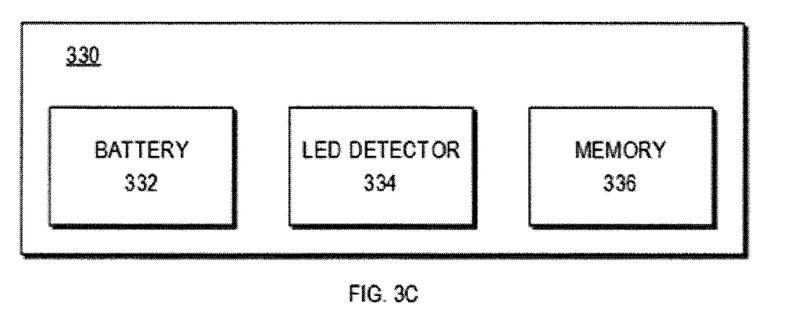

As shown in FIG. 3C, the client 330 is self-powered and comprises a battery 332, an LED detector 334 and a memory 336. The client 330 differs from the client 320 in that the client 330 is powered by the battery 332, instead of being powered by an external power supply via the power supply interface 322. As such, the client 330 and the client 320 may operate in different modes. For example, the self-powered client 330, to save power, may record identifiers of associated reference points upon activation and then get into a standby state, monitoring the state of the device and performing positioning only when the reader sends a command instead of performing real-time monitoring for the state of the device. In contrast, the externally-powered client 320 may monitor the state of the device in real time and may also be operated by the reader.

Figure 3D:
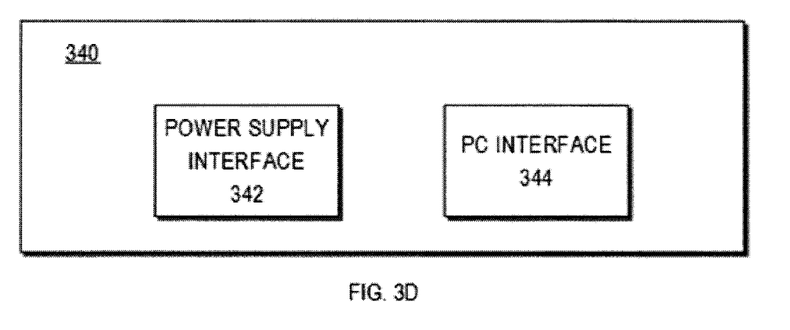
FIG. 3D is a block diagram illustrating a reader according to an embodiment of the present disclosure.

As shown in FIG. 3D, a reader 340 comprises a power supply interface 342 and a computer interface 344. The power supply interface 342 is used to power the reader 340, whereas the computer interface 344 is connected to the computer to control the reader 340. The reader 340 may be used to scan reference points and clients, reader states of the clients and control the clients. The computer interface 344 may assist the reader in expanding more information and assist the clients in better using the positioning system.

It should be appreciated that the devices shown in FIG. 3A-FIG. 3D are only simplified examples, wherein a communication module, a processing module and the like are omitted. Those skilled in the art may appreciate that these devices should further include other necessary parts requisite for implementing embodiments of the present disclosure.

Figure 4A:
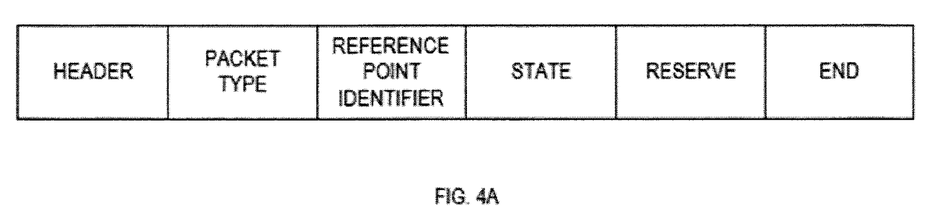
FIG. 4A-FIG. 4E are schematic views illustrating communication packets between respective devices.
Figure 4B:
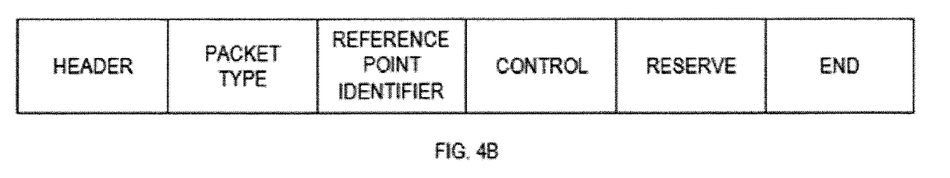
Figure 4C:
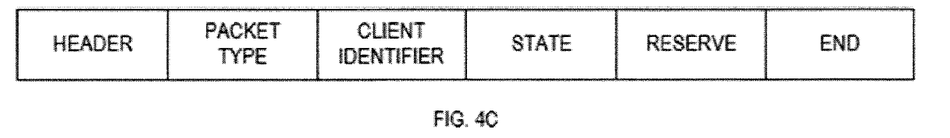
Figure 4D:
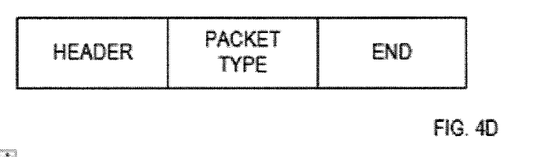
Figure 4E:
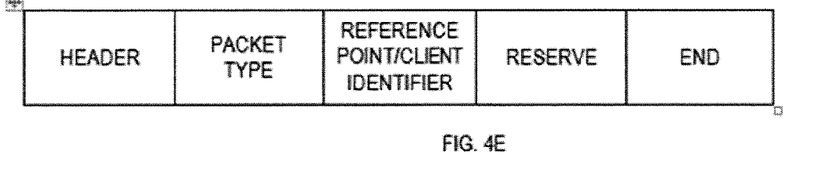

Communication between devices may be based on WiFi, Bluetooth, Bluetooth low energy, RFID and the like. FIGS. 4A-4E illustrate structures of communication packets between devices respectively. Those skilled in the art may further envisage other communication packets to implement the principles of the present disclosure. FIG. 4A shows a broadcast packet of a reference point device which includes a reference point identifier and its state information that is used for the client to record information of the reference point with the strongest signal. FIG. 4B shows a control packet sent by the reader to the reference point. The control packet includes a reference point identifier and control information that is used to send control information to the reference point identified by the reference point identifier, may directly turn on the LED at the reference point, and may be used for repair purpose. FIG. 4C shows a control packet sent by the reader to the client. The control packet includes a client identifier and control information that is used to send control information to the client identified by the client identifier, may order the client to send a message to an associated reference point to trigger of the indicator of the reference point, or may obtain some device state information from the client. FIG. 4D shows a scanning packet sent by the reader to the client. The scanning packet is only required to designate the type of the packet. FIG. 4E shows a response packet of the reference point or client to the reader. The response packet includes a reference point identifier or client identifier. It should be appreciated that the communication packets shown in FIG. 4A-4E are only simple examples. The communication packets are feasible so long as they contain desired necessary information for implementing embodiments of the present disclosure.

Figure 5:
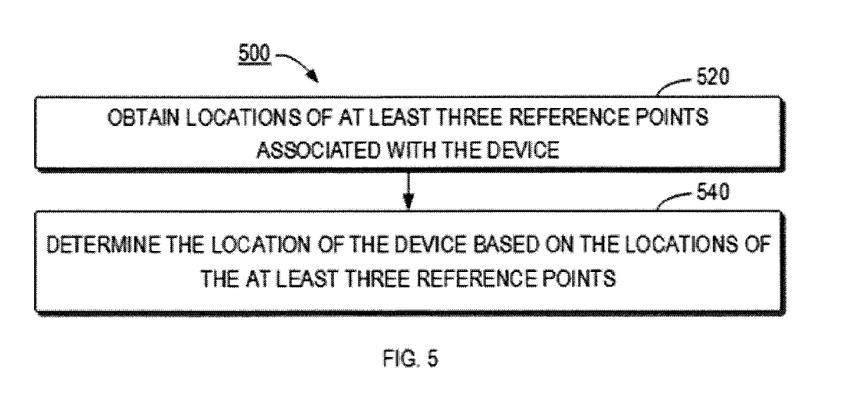
FIG. 5 is a flow chart illustrating a positioning method according to an embodiment of the present disclosure.

FIG. 5 is a flow chart illustrating a positioning method 500 according to an embodiment of the present disclosure. The method 500 comprises step 520 and step 540. At step 520, locations of at least three reference points associated with the device are obtained. At step 540, the location of the device are determined based on the locations of the at least three reference points.

In some embodiments, the method 500 further comprises: pre-establishing associations between the device and the at least three reference points.

In some embodiments, the pre-establishing associations between the device and the at least three reference points comprises: storing into a client at least three reference points received by the client with strongest signals, the client being arranged at the location of the device.

In some embodiments, the obtaining locations of at least three reference points associated with the device comprises: sending, via the client, a message to at least three associated reference points to trigger indicators at the locations of the at least three reference points.

In some embodiments, the method 500 further comprises: instructing, via a reader, the client at the location of the device to send a message to the at least three associated reference points.

In some embodiments, the method 500 further comprises: obtaining state information of the device from the client via the reader.

Figure 6:
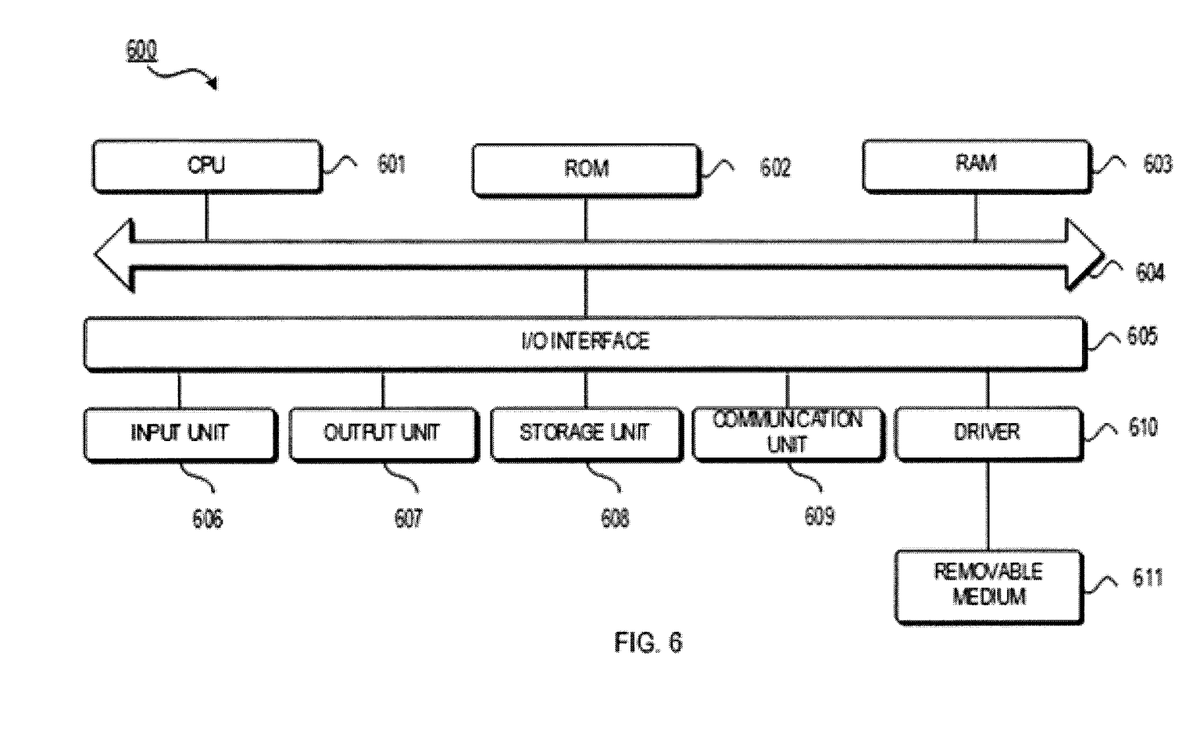
FIG. 6 is a block diagram illustrating a computer system adapted to implement example embodiments of the present disclosure.

Referring to FIG. 6 hereinafter, it illustrates a block diagram of a computer system 600 adapted to implement exemplary embodiments of the present disclosure. As depicted, the computer system 600 includes a central processing unit (CPU) 601 which is capable of performing various processes in accordance with a program stored in a read only memory (ROM) 602 or a program loaded from a storage unit 608 to a random access memory (RAM) 603. In the RAM 603 are further stored various programs and data required for operating the device 200. The CPU 601, the ROM 602 and the RAM 603 are connected to one another via a bus 604. An input/output (I/O) interface 605 is also connected to the bus 604.

The following components are connected to the I/O interface 605: an input unit 606 including a keyboard, a mouse, or the like; an output unit 607 including a display such as a cathode ray tube (CRT), a liquid crystal display (LCD), or the like, and a loudspeaker or the like; the storage unit 608 including a hard disk or the like; and a communication unit 609 including a network interface card such as a LAN card, a modem, or the like. The communication unit 609 performs a communication process via the network such as the internet. A drive 610 is also connected to the I/O interface 605 as required. A removable medium 611, such as a magnetic disk, an optical disk, a magneto-optical disk, a semiconductor memory, or the like, is mounted on the drive 610 as required, so that a computer program read therefrom is installed into the storage unit 608 as required.

Specifically, in accordance with embodiments of the present disclosure, the method 500 described above with reference to FIG. 5 may be implemented as computer software programs. For example, embodiments of the present disclosure include a computer program product which is tangibly stored on a non-transitory computer-readable medium and includes computer-executable instructions, wherein the computer-executable instructions, when executed, enable the computer to execute any step in the method 500.

To sum up, embodiments of the present disclosure provide a method and device for determining a location of the device. The embodiments of the present disclosure have advantages such as cheapness, easy implementation and easy installation, may provide the administrator with various management interfaces and monitoring interfaces, and expand the scope of applicability.

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it will be appreciated that the blocks, apparatus, systems, techniques or methods disclosed herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product including a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Computer program code for carrying out methods disclosed herein may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter disclosed herein or of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination.

Various modifications, adaptations to the foregoing example embodiments disclosed herein may become apparent to those skilled in the relevant arts in view of the foregoing description, when read in conjunction with the accompanying drawings. Any and all modifications will still fall within the scope of the non-limiting and example embodiments disclosed herein. Furthermore, other embodiments disclosed herein will come to mind to one skilled in the art to which those embodiments pertain having the benefit of the teachings presented in the foregoing descriptions and the drawings.

It will be appreciated that the embodiments of the subject matter disclosed herein are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method of determining a location of a device, comprising:
    providing a plurality of reference points enabled to communicate with the device;
    obtaining locations of at least three reference points of the plurality of reference points, wherein the at least three reference points are associated with the device;
    triggering indicators at the at least three reference points when an operation state of the device is abnormal;
    activating an abnormal state indicator on the device; and
    determining the location of the device based on the locations of the at least three reference points.

2. The method of claim 1, further comprising:
    pre-establishing associations between the device and the at least three reference points.

3. The method of claim 2, wherein the pre-establishing associations between the device and the at least three reference points comprises:
    storing into a client at least three reference points received by the client with strongest signals, the client being arranged at the location of the device.

4. The method of claim 1, wherein the obtaining locations of at least three reference points associated with the device comprises:
    sending, via the client, a message to at least three associated reference points to trigger indicators at the locations of the at least three reference points.

5. The method of claim 4, further comprising:
    instructing, via a reader, the client at the location of the device to send a message to the at least three associated reference points.

6. The method of claim 5, further comprising:
    obtaining state information of the device from the client via the reader.

7. A computer program product for determining a location of a device, the computer program product comprising:
    a non-transitory computer-readable medium encoded with computer-executable code, the code configured to enable the execution of:
    providing a plurality of reference points enabled to communicate with the device;
    obtaining locations of at least three reference points of the plurality of reference points, wherein the at least three reference points are associated with the device;
    triggering indicators at the at least three reference points when an operation state of the device is abnormal;
    activating an abnormal state indicator on the device; and
    determining the location of the device based on the locations of the at least three reference points.

8. The computer program product of claim 7, wherein the code is further configured to enable the execution of:
    pre-establishing associations between the device and the at least three reference points.

9. The computer program product of claim 8, wherein the pre-establishing associations between the device and the at least three reference points comprises:
storing into a client at least three reference points received by the client with strongest signals, the client being arranged at the location of the device.

10. The computer program product of claim 7, wherein the obtaining locations of at least three reference points associated with the device comprises:
sending, via the client, a message to at least three associated reference points to trigger indicators at the locations of the at least three reference points.

11. The computer program product of claim 10, wherein the code is further configured to enable the execution of:
instructing, via a reader, the client at the location of the device to send a message to the at least three associated reference points.

12. The computer program product of claim 11, wherein the code is further configured to enable the execution of:
obtaining state information of the device from the client via the reader.

13. A method of identifying a data center device among multiple data center devices to a user, the method comprising:
communicating, from a device location where the data center device resides, with at least three reference point devices residing at reference point locations which are different from the device location to determine the device location where the data center device resides;
in response to the data center device entering an abnormal state, providing human discernable reference point indicators from the at least three reference point devices residing at reference point locations; and
activating an abnormal state indicator on the data center device;
the data center device being identified to the user via the human discernable reference point indicators provided from the at least three reference point devices and the abnormal state indicator activated on the data center device.

14. The method of claim 13 wherein communicating from the device location where the data center device resides includes:
receiving, by a client apparatus physically coupled with the data center device, broadcasted signals from a plurality of reference point devices and identifying, as the at least three reference point devices, a subset of the plurality of reference point devices providing the strongest signals;
wherein the client apparatus is constructed and arranged to notify data center equipment which is separate from the multiple data center devices to enable the data center equipment to operate the subset of the plurality of reference point devices to provide the human discernable reference point indicators.

* * * * *